(12) United States Patent
Garcia (10) Patent No.: US 10,778,895 B1
(45) Date of Patent: Sep. 15, 2020

(54) SYSTEMS AND METHODS FOR STABILIZING VIDEOS

(71) Applicant: GoPro, Inc., San Mateo, CA (US)

(72) Inventor: Vincent Garcia, Issy-les-Moulineaux (FR)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 16/225,378

(22) Filed: Dec. 19, 2018

(51) Int. Cl.
*H04N 5/232* (2006.01)
(52) U.S. Cl.
CPC ....... *H04N 5/23267* (2013.01); *H04N 5/2327* (2013.01); *H04N 5/23218* (2018.08); *H04N 5/23254* (2013.01)

(58) Field of Classification Search
CPC .......... H04N 5/23267; H04N 5/23218; H04N 5/2327; H04N 5/23254
See application file for complete search history.

(56) References Cited

U.S. PATENT DOCUMENTS

| 2016/0088287 A1* | 3/2016 | Sadi ........................ H04N 19/54 348/43 |
| 2017/0244884 A1* | 8/2017 | Burtey .................... G06F 3/011 |
| 2018/0160194 A1* | 6/2018 | Bayliss ............ H04N 21/47217 |

\* cited by examiner

*Primary Examiner* — Mekonnen D Dagnew
(74) *Attorney, Agent, or Firm* — Esplin & Associates, PC (57) ABSTRACT

A video, such as a spherical video, may include motion due to motion of one or more image capture devices during capture of the video. Motion of the image capture devices during the capture of the video may cause the playback of the video to appear jerky/shaky. The video may be stabilized by using both a horizontal feature and a fixed feature captured within the video.

20 Claims, 8 Drawing Sheets

SYSTEMS AND METHODS FOR STABILIZING VIDEOS

FIELD

This disclosure relates to stabilizing a video based on a horizontal feature and a fixed feature within the video.

BACKGROUND

Capture of video content (e.g., spherical video content) by one or more image capture devices may include artifacts due to rotational motion of the image capture device(s). Motion (e.g., rotation) of the image capture device(s) during the capture of the video content may cause the playback of the video content to appear jerky/shaky.

SUMMARY

This disclosure relates to stabilizing videos. Video information defining a spherical video and/or other information may be obtained. The spherical video may include spherical video content having a progress length. The spherical video content may include visual content viewable from a point of view as a function of progress through the progress length. A horizontal feature within the visual content may be identified. A fixed feature within the visual content may be identified. The fixed feature may be different from the horizontal feature. The visual content may be rotated based on the horizontal feature, the fixed feature, and/or other information to stabilize the spherical video.

A system that stabilizes videos may include one or more electronic storage, processor and/or other components. The electronic storage may store video information defining videos, information relating to videos, information relating to horizontal features, information relating to fixed feature, information relating to rotation of videos, and/or other information.

The processor(s) may be configured by machine-readable instructions. Executing the machine-readable instructions may cause the processor(s) to facilitate stabilizing videos. The machine-readable instructions may include one or more computer program components. The computer program components may include one or more of a video information component, a horizontal feature component, a fixed feature component, a rotation component, and/or other computer program components.

The video information component may be configured to obtain video information and/or other information. The video information component may obtain video information from one or more storage locations. The video information component may obtain video information during acquisition of the video and/or after acquisition of the video by one or more image capture devices.

Video information may define a video. The video may include video content having a progress length. The video content may include visual content viewable as a function of progress through the progress length. For example, video information may define a spherical video, and the spherical video may include spherical video content. The spherical video content may include visual content viewable from a point of a view as a function of progress through the progress length.

The horizontal feature component may be configured to identify a horizontal feature within the visual content. In some implementations, the horizontal feature may include a depiction of a horizon within the visual content. In some implementations, the horizon may be identified based on variance of pixel characteristic within the visual content. For example, the horizon may be identified such that a first variance of pixel characteristics below the horizon and a second variance of pixel characteristics above the horizon are minimized.

The fixed feature component may be configured to identify a fixed feature within the visual content. The fixed feature may be different from the horizontal feature. In some implementations, the fixed feature may include a depiction of a distant object within the visual content. In some implementations, the distant object may include a light source, such as the Sun. In some implementations, the distant object may be identified based on identification of a round shape and saturation of pixels within the round shape. In some implementations, position of the fixed feature within the visual content may be changed as the function of progress through the progress length to account for movement of the distant object (e.g., the Sun) during the progress length.

The rotation component may be configured to rotate the visual content based on the horizontal feature, the fixed feature, and/or other information to stabilize the video (e.g., spherical video). In some implementations, rotation of the visual content based on the horizontal feature may provide tilt stabilization and rotation of the visual content based on the fixed feature may provide lateral stabilization.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
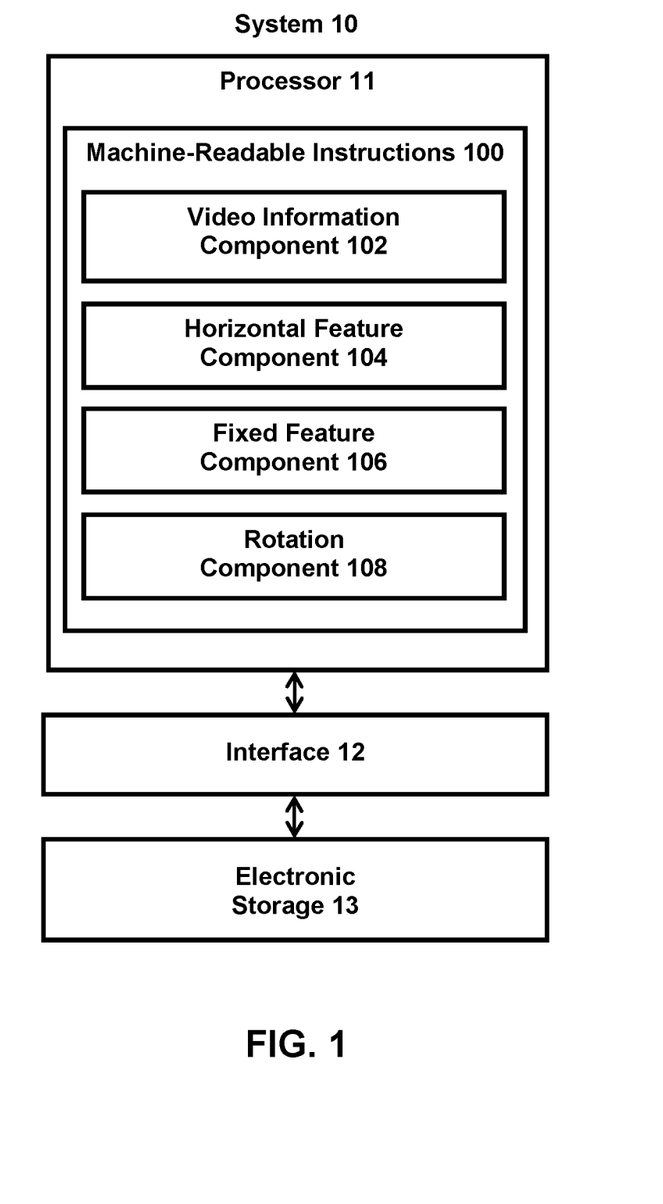
FIG. 1 illustrates a system that stabilizes videos.

FIG. 1 illustrates a system 10 for stabilizing videos. The system 10 may include one or more of a processor 11, an interface 12 (e.g., bus, connection, wireless interface), an electronic storage 13, and/or other components. Video information defining a spherical video and/or other information may be obtained by the processor 11. The spherical video may include spherical video content having a progress length. The spherical video content may include visual content viewable from a point of view as a function of progress through the progress length. A horizontal feature within the visual content may be identified. A fixed feature within the visual content may be identified. The fixed feature may be different from the horizontal feature. The visual content may be rotated based on the horizontal feature, the fixed feature, and/or other information to stabilize the spherical video.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store video information defining videos, information relating to videos, information relating to horizontal features, information relating to fixed feature, information relating to rotation of videos, and/or other information.

A video may include content captured by a single image capture device (e.g., image sensor, camera), multiple image capture devices, and/or one or more other capture devices (e.g., sound sensor, microphone). A video including content captured by multiple capture devices may include content captured at the same location(s), content captured at different locations, content captured at the same time(s), and/or content captured at different times. A video may include edited content. For example, a video may include content of one or more other videos that have been edited into a video edit.

Content of one or more videos may be referred to as video content. Video content may have a progress length. That is, a video may include video content having a progress length. A progress length may be defined in terms of time durations and/or frame numbers. For example, video content of a video may have a time duration of 60 seconds. Video content of a video may have 1800 video frames. Video content having 1800 video frames may have a play time duration of 60 seconds when viewed at 30 frames per second. Other progress lengths, time durations, and frame numbers are contemplated.

Video content may include visual content, audio content, and/or other content. For example, video content may include visual content viewable as a function of progress through the progress length of the video content, audio content playable as a function of progress through the progress length of the video content, and/or other content that may be played back as a function of progress through the progress length of the video content.

Visual content may refer to content of one or more images and/or one or more videos that may be consumed visually. For example, visual content may be included within one or more image and/or one or more video frames of a video. The video frame(s) may define the visual content of the video content. That is, video content may include video frame(s) that define the visual content of the video content. Video frame(s) may define visual content viewable as a function of progress through the progress length of the video content. A video frame may include an image of the video content at a moment within the progress length of the video content. Visual content may be generated based on light received within a field of view of a single image sensor or within fields of view of multiple image sensors during a capture period.

Audio content may include audio/sound captured (e.g., by sound sensor(s), microphone(s)) with the capture of the visual content and/or audio/sound provided as an accompaniment for the visual content. Audio content may include one or more of voices, activities, songs, music, and/or other audio/sounds. For example, audio content may include sounds captured by a single sound sensor or an array of sound sensors. The sound sensor(s) may receive and convert sounds into output signals. The output signals may convey sound information and/or other information. The sound information may define audio content in one or more formats, such as WAV, MP3, MP4, RAW. Audio content may include audio/sound generated by one or more computing devices, such as procedural audio. Audio content may be synchronized with the visual content. For example, audio content may include music, song, and/or soundtrack, and the visual content of the video content may be synchronized with music, song, and/or soundtrack.

In some implementations, video content may include one or more of spherical video content, virtual reality content, and/or other video content. For example, video information may define a spherical video, and the spherical video may include spherical video content. Spherical video content and/or virtual reality content may include visual content viewable from one or more points of view as a function of progress through the progress length of the spherical/virtual reality video content.

Spherical video content may refer to video content generated through capture of multiple views from a single location. Spherical video content may be captured through the use of one or more image capture devices to capture images/videos from a location. The captured images/videos may be stitched together to form the spherical video content. Spherical video content may include full spherical video content (360 degrees of capture) or partial spherical video content (less than 360 degrees of capture). Partial spherical video content may be referred to as panoramic video content.

Visual content of spherical video content may be included within one or more spherical video frames of the spherical video. The spherical video frame(s) may define the visual content of the video content. That is, spherical video content may include spherical video frame(s) that define the visual content of the spherical video content. Spherical video frame(s) may define visual content viewable from a point of view (e.g., within a sphere, center of a sphere) as a function of progress through the progress length of the spherical video content.

Figure 3:
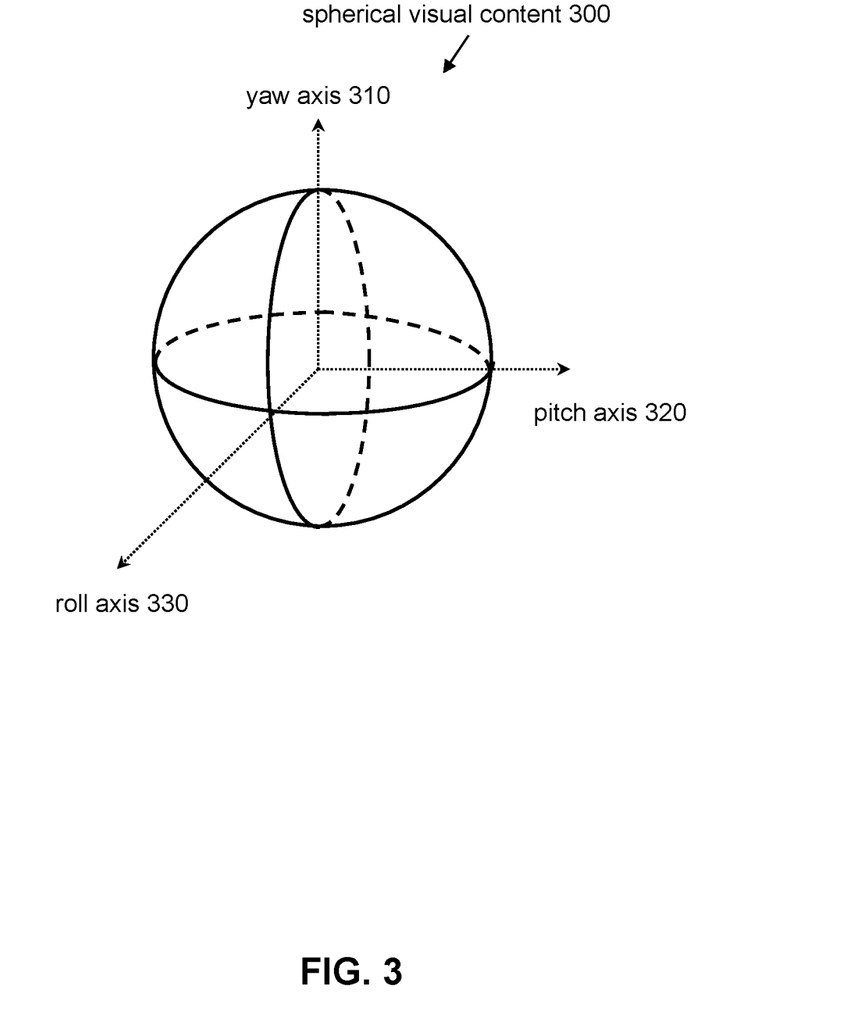
FIG. 3 illustrates an example spherical visual content.

FIG. 3 illustrates an example spherical visual content 300. The spherical visual content 300 may include content of a spherical image or a spherical video. The spherical visual content 300 may include visual content viewable from a point of view (e.g., center of sphere) as a function of progress through the progress length of the spherical visual content 300. FIG. 3 illustrates example rotational axes for the spherical visual content 300. Rotational axes for the spherical visual content 300 may include a yaw axis 310, a pitch axis 320, a roll axis 330, and/or other axes. Rotations about one or more of the yaw axis 310, the pitch axis 320, the roll axis 330, and/or other axes may define directions of view (e.g., viewing directions) for the spherical visual content 300.

For example, a 0-degree rotation of the spherical visual content 300 around the yaw axis 310 may correspond to a front viewing direction. A 90-degree rotation of the spherical visual content 300 around the yaw axis 310 may correspond to a right viewing direction. A 180-degree rotation of the spherical visual content 300 around the yaw axis 310 may correspond to a back-viewing direction. A −90-degree rotation of the spherical visual content 300 around the yaw axis 310 may correspond to a left viewing direction.

A 0-degree rotation of the spherical visual content 300 around the pitch axis 320 may correspond to a viewing direction that may be level with respect to horizon. A 45-degree rotation of the spherical visual content 300 around the pitch axis 320 may correspond to a viewing direction that may be pitched up with respect to horizon by 45-degrees. A 90-degree rotation of the spherical visual content 300 around the pitch axis 320 may correspond to a viewing direction that may be pitched up with respect to horizon by 90-degrees (looking up). A −45-degree rotation of the spherical visual content 300 around the pitch axis 320 may correspond to a viewing direction that may be pitched down with respect to horizon by 45-degrees. A −90-degree rotation of the spherical visual content 300 around the pitch axis 320 may correspond to a viewing direction that may be pitched down with respect to horizon by 90-degrees (looking down).

A 0-degree rotation of the spherical visual content 300 around the roll axis 330 may correspond to a viewing direction that may be upright. A 90-degree rotation of the spherical visual content 300 around the roll axis 330 may correspond to a viewing direction that may be rotated to the right by 90-degrees. A −90-degree rotation of the spherical visual content 300 around the roll axis 330 may correspond to a viewing direction that may be rotated to the left by 90-degrees. Other rotations and viewing directions are contemplated.

A playback of video content (e.g., the spherical video content) may include presentation of one or more portions of visual content on one or more displays based on a viewing window and/or other information. A viewing window may define extents of the visual content viewable on one or more displays as the function of progress through the progress length of the video content. The viewing window may define extents of the visual content presented on the display(s) as the function of progress through the progress length of the video content. For spherical video content, the viewing window may define extents of the visual content viewable from the point of view as the function of progress through the progress length of the spherical video content.

The viewing window may be characterized by viewing directions, viewing sizes (e.g., viewing zoom, viewing magnification), viewing rotations, and/or other information. A viewing direction may define a direction of view for video content. A viewing direction may define the angle/visual portion of the video content at which the viewing window may be directed. A viewing direction may define a direction of view for the video content selected by a user, defined by instructions for viewing the video content, and/or determined based on other information about viewing the video content as a function of progress through the progress length of the video content (e.g., director track specifying viewing direction to be presented during playback as a function of progress through the progress length of the video content). For spherical video content, a viewing direction may define a direction of view from the point of view from which the visual content may be defined. Viewing directions for the video content may be characterized by rotations around the yaw axis 310, the pitch axis 320, the roll axis 330, and/or other axes. For example, a viewing direction of a 0-degree rotation of the video content around a yaw axis (e.g., the yaw axis 310) and a 0-degree rotation of the video content around a pitch axis (e.g., the pitch axis 320) may correspond to a front viewing direction (the viewing window may be directed to a forward portion of the visual content captured within the spherical video content).

Figure 4:
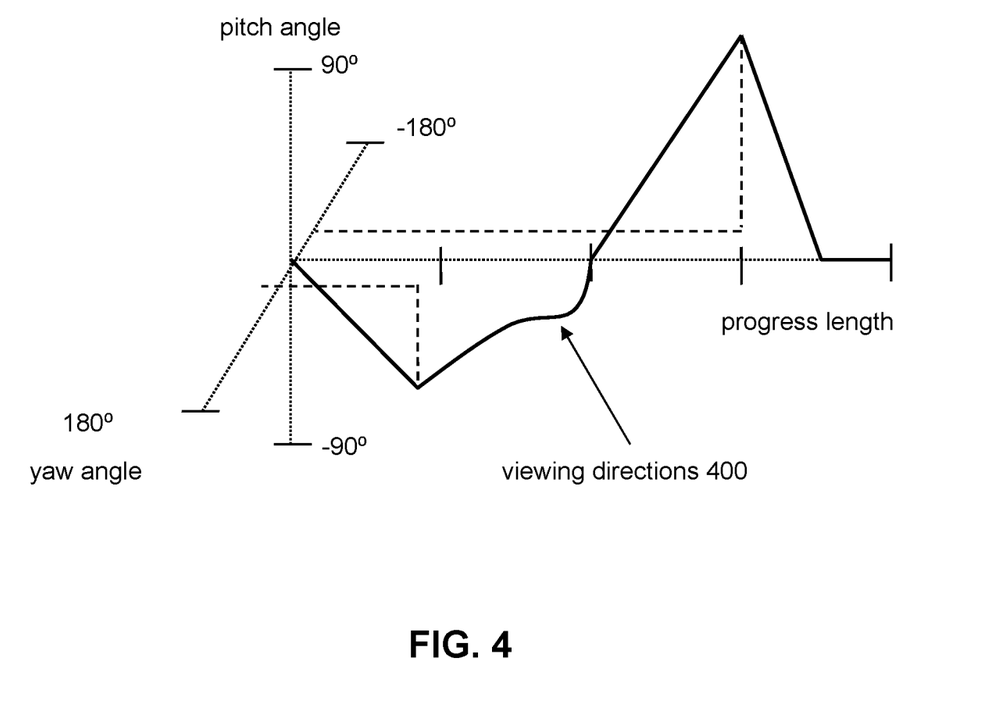
FIG. 4 illustrates example viewing directions for spherical video content.

For example, FIG. 4 illustrates example changes in viewing directions 400 (e.g., selected by a user for video content, specified by a director's track) as a function of progress through the progress length of the video content. The viewing directions 400 may change as a function of progress through the progress length of the video content. For example, at 0% progress mark, the viewing directions 400 may correspond to a zero-degree yaw angle and a zero-degree pitch angle. At 25% progress mark, the viewing directions 400 may correspond to a positive yaw angle and a negative pitch angle. At 50% progress mark, the viewing directions 400 may correspond to a zero-degree yaw angle and a zero-degree pitch angle. At 75% progress mark, the viewing directions 400 may correspond to a negative yaw angle and a positive pitch angle. At 87.5% progress mark, the viewing directions 400 may correspond to a zero-degree yaw angle and a zero-degree pitch angle. The viewing directions 400 may define a path of movement for the viewing window (e.g., a trajectory followed by the viewing window) as a function of progress through the progress length of the video content. Other viewing directions are contemplated.

A viewing size may define a size of a viewing window. A viewing size may define a size (e.g., size, magnification, viewing angle) of viewable extents of visual content within the video content. A viewing size may define the dimensions of the viewing window. A viewing size may define a size of viewable extents of visual content within the video content selected by a user, defined by instructions for viewing the video content, and/or determined based on other information about viewing the video content as a function of progress through the progress length of the video content (e.g., director track specifying viewing size to be presented as a function of progress through the progress length of the video content). In some implementations, a viewing size may define different shapes of viewable extents. For example, a viewing window may be shaped as a rectangle, a triangle, a circle, and/or other shapes.

A viewing rotation may define a rotation of the viewing window. A viewing rotation may define one or more rotations of the viewing window about one or more axis. In some implementations, a viewing rotation may be defined by one or more parameters of a viewing direction. For example, a viewing rotation may be defined based on rotation about an axis (e.g., the roll axis 330) corresponding to a viewing direction. A viewing rotation may define a rotation of the viewing window selected by a user, defined by instructions for viewing the video content, and/or determined based on other information about viewing the video content as a function of progress through the progress length of the video content (e.g., director track specifying viewing rotation to be used as a function of progress through the progress length of the video content). For example, a viewing rotation of a viewing window having a rectangular shape may determine whether the rectangular viewing window is to be positioned in a portrait orientation (e.g., for a portrait view of the video content), in a landscape orientation (e.g., for a landscape view of the video content), and/or other orientation with respect to the visual content of the video content.

Figure 5A:
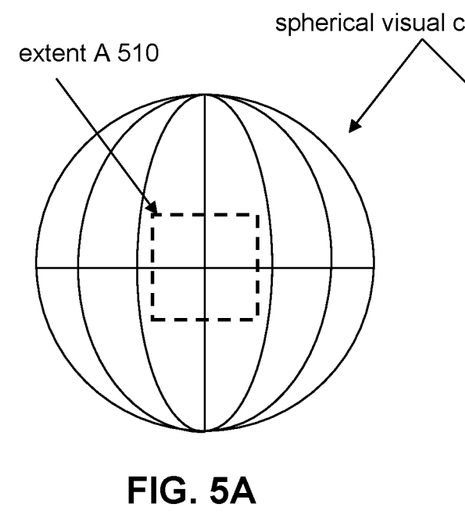
FIGS. 5A-5B illustrate example extents of spherical visual content.
Figure 5B:
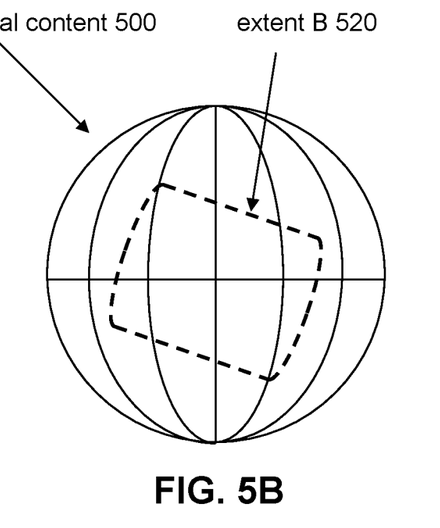

FIGS. 5A-5B illustrate examples of extents for spherical visual content 500. In FIG. 5A, the size of the viewable extent of the spherical visual content 500 may correspond to the size of extent A 510. In FIG. 5B, the size of viewable extent of the spherical visual content 500 may correspond to the size of extent B 520. Viewable extent of the spherical visual content 500 in FIG. 5A may be smaller than viewable extent of the spherical visual content 500 in FIG. 5B. The viewable extent of the spherical visual content 500 in FIG. 5B may be more tilted with respect to the spherical visual content 500 than viewable extent of the spherical visual content 500 in FIG. 5A. Other viewing sizes and viewing rotations are contemplated.

Referring back to FIG. 1, the processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate stabilizing videos. The machine-readable instructions 100 may include one or more computer program components. The machine-readable instructions 100 may include one or more of a video information component 102, a horizontal feature component 104, a fixed feature component 106, a rotation component 108, and/or other computer program components.

The video information component 102 may be configured to obtain video information and/or other information. Obtaining video information may include one or more of accessing, acquiring, analyzing, determining, examining, identifying, loading, locating, opening, receiving, retrieving, reviewing, storing, and/or otherwise obtaining the video information. The video information component 102 may obtain video information from one or more locations. For example, the video information component 102 may obtain video information from a storage location, such as the electronic storage 13, electronic storage of information and/or signals generated by one or more image sensors, electronic storage of a device accessible via a network, and/or other locations. The video information component 102 may obtain video information from one or more hardware components (e.g., an image sensor) and/or one or more software components (e.g., software running on a computing device).

The video information component 102 may be configured to obtain video information defining a video during acquisition of the video and/or after acquisition of the video by one or more image sensors/image capture devices. For example, the video information component 102 may obtain video information defining a video while the video is being captured by one or more image sensors/image capture devices. The video information component 102 may obtain video information defining a video after the video has been captured and stored in memory (e.g., the electronic storage 13).

In some implementations, the video information may be obtained based on user interaction with a user interface/application (e.g., video editing application), and/or other information. For example, a user interface/application may provide option(s) for a user to select one or more videos which are to be stabilized. The video information defining the video(s) may be obtained based on the user's selection of the video(s) through the user interface/video application.

Video information may define one or more videos (e.g., non-spherical video, spherical video, panoramic video). Video information may be stored within a single file or multiple files. For example, video information defining a video may be stored within a video file, multiple video files, a combination of different files (e.g., a visual file and an audio file), and/or other files. Video information may be stored in one or more formats/container. A format may refer to one or more ways in which the information defining a video is arranged/laid out (e.g., file format). A container may refer to one or more ways in which information defining a video is arranged/laid out in association with other information (e.g., wrapper format).

The horizontal feature component 104 may be configured to identify one or more horizontal features within the visual content. A horizontal feature may refer to a portion of the visual content that has one or more horizontal characteristics. A horizontal feature may refer to a portion of the visual content that is shaped horizontally and has the same or similar pixel characteristics. A horizontal feature may refer to a portion of the visual content that is shaped horizontally and divide the visual content into two portions with different pixel characteristics. A pixel characteristic may refer to a feature or a quality of a pixel, such as color, hue, saturation, lightness, luminance, and/or other pixel characteristic. For example, a horizontal feature may include a depiction of a horizon within the visual content.

Identifying a horizontal feature within the visual content may include determining whether a horizontal feature is included within the visual content and/or determining the location of the horizontal feature within the visual content. A horizonal feature may be identified based on visual analysis of the visual content. For example, the visual content may be analyzed to identify horizontally shaped portion that has the same or similar pixel characteristics. The visual content may be analyzed to determine the variance of pixel characteristic within the visual content. Variance of pixel characteristic may refer to how the pixel characteristic varies throughout the visual content. The horizontal feature may be identified such that the variance of one or more pixel characteristics below the horizon feature and the variance of one or more pixel characteristics above the horizon feature are minimized. The visual content may be analyzed to determine the means of pixel characteristic within different portions of the visual content. A mean of pixel characteristic may refer to an average of pixel characters within a portion of the visual content. The horizontal feature may be identified such that the difference in the mean of one or more pixel characteristics below the horizon feature and the mean of one or more pixel characteristics above the horizon feature are maximized. Other identification of horizontal feature(s) within visual content are contemplated.

The fixed feature component 106 may be configured to identify one or more fixed features within the visual content. A fixed feature may refer to a portion of the visual content that depicts an objects that is fixed or relatively fixed in space during capture of the visual content. A fixed feature may be different from a horizontal feature. In some implementations, a fixed feature may include a depiction of a distant object within the visual content. A distant object may refer to an object that was distant from the image capture device(s) that captured the visual content. In some implementations, the fixed feature may include a depiction of a light source, such as the Sun, the moon, or some other distant light source. Given that the Sun, the moon, or some other distant light source is far away from the image capture device(s) and that they are fixed/relatively fixed given the duration of the video, the depiction of such objects may be treated as a fixed feature for stabilization of the visual content. In some implementations, position of the fixed feature within the visual content may be changed as the function of progress through the progress length to account for movement of the distant object (e.g., the Sun, moon) during the progress length. That is, the position of the fixed feature may be changed to account for the movement of the distant object during capture of the visual content.

Identifying a fixed feature within the visual content may include determining whether a fixed feature is included within the visual content and/or determining the location of the fixed feature within the visual content. A fixed feature may be identified based on visual analysis of the visual content. For example, a distant light source (e.g., the Sun, the moon, other distant light source) may be identified based on identification of a particular shape (e.g., round shape, crescent shape) and saturation of pixels within the particular shape. Because the light sources are generating light, the pixels depicting the light sources within the visual content may be saturated. Identification of a fixed feature based on shape and saturation of pixels may provide a light-weight visual analysis to identify the fixed feature. Identification of a fixed feature based on shape and saturation of pixels may require consumption of small amount of resources (e.g., battery charge, processing power, memory). For example, identification of a fixed feature based on shape and saturation of pixels may require consumption of less resources than other object detection techniques and/or distant object detection using a three-dimensional map of the environment around the image capture device. Other identification of fixed feature(s) within visual content are contemplated.

The rotation component 108 may be configured to rotate the visual content based on the horizontal feature, the fixed feature, and/or other information. The rotation of the visual content may stabilize the video (e.g., spherical video). For example, during the capture of the video, the image capture device(s) may have been rotated, which may cause playback of the video to appear jerky or shaky. The stabilization of the visual content may remove jerky or shaky motion of the video. The rotational component 108 may use the positions of the horizontal feature and the fixed feature within the visual content to rotate the visual content (e.g., about one or more of yaw axis, pitch axis, and/or roll axis; about one or more points). The rotation of the visual content by the rotation component 108 may compensate for rotations of the image capture device(s) during capture of the visual content.

The rotation of the visual content by the rotation component 108 may include rotation of one or more video frames (e.g., spherical video frames) of the video. The visual content may be rotated such that a video frame (e.g., a spherical video frame) is rotated based on the positions of the horizontal feature and the fixed feature within the video frame, one or more preceding video frames, and/or one or more following video frames. The rotation of the visual content may include rotation of one or more video frames (e.g., spherical video frames) of the video to compensate for the rotations of the image capture device(s) during capture of the video and to stabilize the video (e.g., spherical video). Such rotation of the visual content may orient the video frames according to the positions of the horizontal feature and the fixed feature within the visual content.

Figure 6:
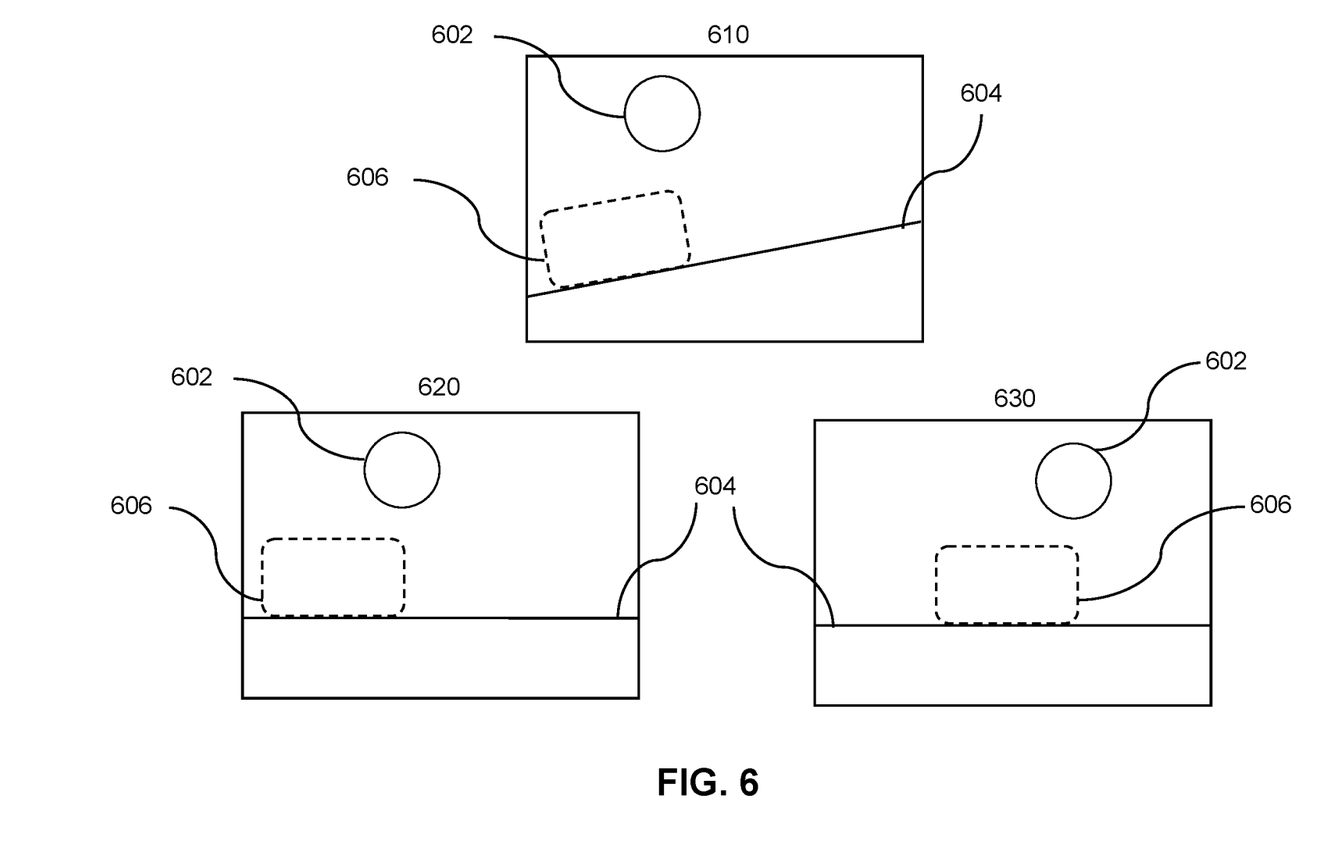
FIG. 6 illustrates example rotations of visual content.

Rotation of the visual content based on one of the features within the visual content may not be sufficient to stabilize the visual content. For example, rotation of the visual content based on just the horizonal feature may not be sufficient to stabilized the visual content. For example, FIG. 6 illustrates example rotations of visual content. FIG. 6 illustrates three views 610, 620, 630 of an image (a video frame of a video). The image may include a spherical image, and the views 610, 620, 630 may include visual content of the spherical image within a viewing window. Based on rotations of image capture device(s) during capture of the spherical image, a viewing window directed at the front of the spherical image may how a tiled view of a scene, such as shown within the view 610. The view 610 may include a depiction of the Sun 602, a depiction of a horizon 604, and a depiction of an object 606. Stabilization of the image based on the depiction of the horizon 604 may result in the view 620, the view 630, and/or other views. While stabilization of the image based on the depiction of the horizon 604 may level the image based on the horizon (e.g., the horizon is leveled within the rotated image), the stabilization based on the horizon may not be able to fix the lateral rotation of the visual content. That is, simply based on the horizon, stabilization of the visual content may not be able to determine which of the views 620, 630 or other view represents a stabilized view of the image.

By using the depiction of fixed/relative fixed object (e.g., a distant object, the Sun) as a fixed point, the visual content may be fully stabilized. The rotation of the visual content based on the horizontal feature and the fixed feature may include minimization of the displacement of the horizontal feature and the fixed feature to fully stabilized the visual content. For example, referring to FIG. 6, the displacement of the depiction of the horizon 604 and the depiction of the Sun 602 may be minimized between video frames to stabilize the video frames within the video. Such minimization of the displacement may be used to determine which of the views 620, 630 or other view represents a stabilized view of the image.

In some implementations, position of the fixed feature within the visual content may be changed as the function of progress through the progress length to account for movement of the relatively fixed object (e.g., the Sun, moon) during capture of the visual content. That is, the position of the fixed feature within video frames of a video may change to account for the movement of the object that is relatively fixed during capture of the video frames.

In some implementations, rotation of the visual content based on the horizontal feature may provide tilt stabilization and rotation of the visual content based on the fixed feature may provide lateral stabilization. Tilt stabilization may include stabilization to remove sloping of horizonal feature within the visual content. Lateral stabilization may include side-to-side stabilization of the visual content.

Figure 7A:
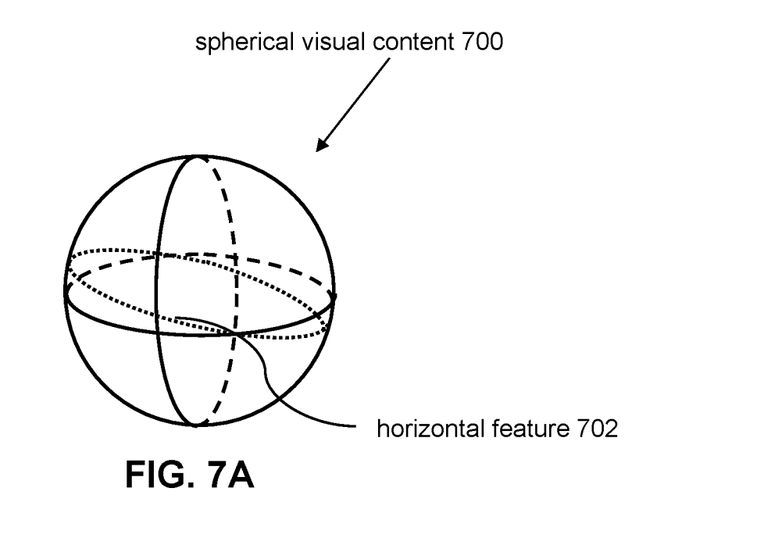
FIGS. 7A-7D illustrate example rotations of spherical visual content.
Figure 7B:
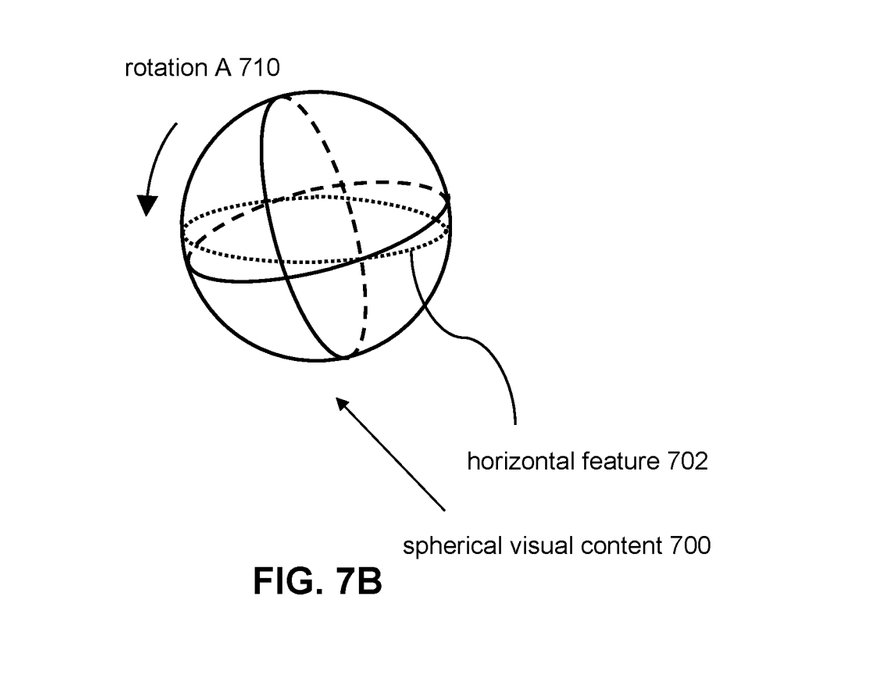
Figure 7C:
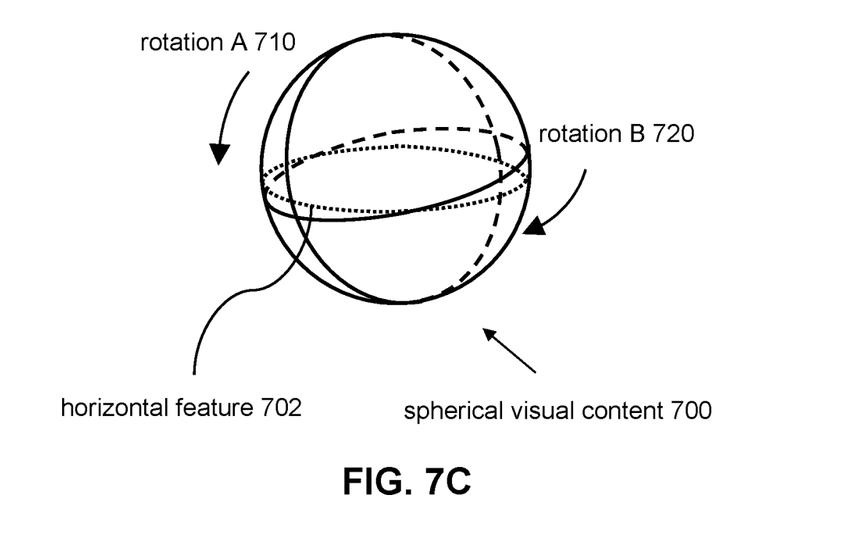

For example, FIGS. 7A-7D illustrate example rotations of spherical visual content 700. FIG. 7A illustrates an unrotated representation of the spherical visual content 700. As shown in FIG. 7A, a horizontal feature 702 captured within the spherical visual content 700 may be sloped. FIG. 7B illustrates a rotated representation of the spherical visual content 700. As shown in FIG. 7B, the spherical visual content 700 may be tilted via rotation A 710, and the horizontal feature 702 captured within the spherical visual content 700 may be leveled. FIG. 7C illustrates a rotated representation of the spherical visual content 700. As shown in FIG. 7C, the spherical visual content 700 may be tilted via rotation A 710, and the horizontal feature 702 captured within the spherical visual content 700 may be leveled. The spherical visual content 700 may also be rotated laterally via rotation B 720. As shown in FIGS. 7B and 7C, stabilization of the spherical visual content 700 based on just the horizontal feature 702 may not be able to account for lateral rotation of the spherical visual content 700 and may not fully stabilize the spherical visual content 700. Stabilization of the spherical visual content 700 based on just the horizontal feature 702 may allow the spherical visual content 700 to spin laterally.

Figure 7D:
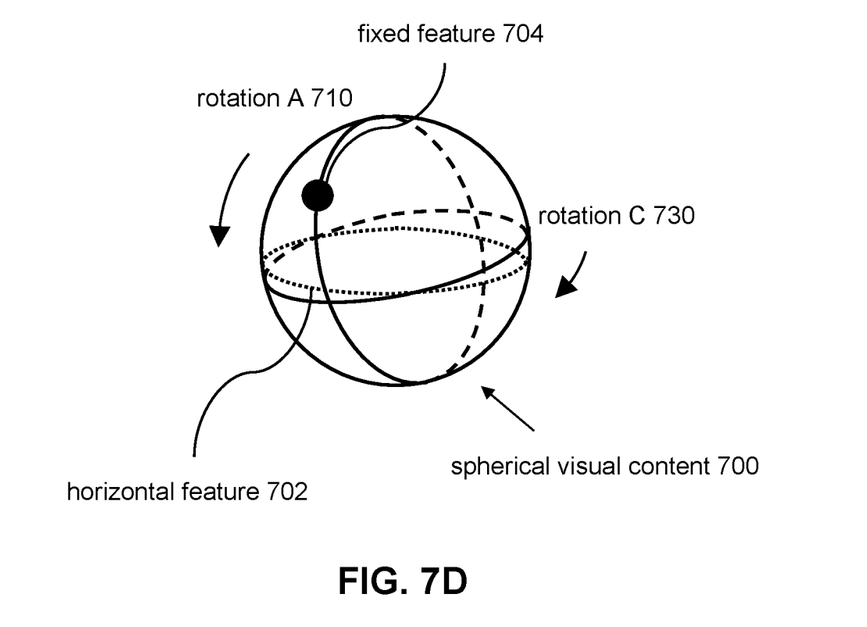

FIG. 7D illustrates a rotated representation of the spherical visual content 700. As shown in FIG. 7D, the spherical visual content 700 may be tilted via rotation A 710, and the horizontal feature 702 captured within the spherical visual content 700 may be leveled. The spherical visual content

700 may also be rotated laterally via rotation C 730. The rotation C 730 may be performed based on the position of a fixed feature 704 within the spherical visual content. The fixed feature 704 may stabilize the spherical visual content 700 laterally, and prevent lateral movement/spinning of the spherical visual content 700. Thus, stabilization of the spherical visual content 700 based on both the horizontal feature 702 and the fixed feature 704 may fully stabilized the spherical visual content 700 (e.g., stabilize the spherical visual content 700 vertically and laterally).

In some implementations, the rotated visual content may be warped. The warping of the visual content may include warping of one or more video frames (e.g., spherical video frames) of the video to compensate for rolling shutter of image sensor(s) during capture of the visual content and to provide rolling shutter correction. Rolling shutter of the image sensor(s) may include pixel lines of the video frames being acquired progressively (e.g., the upper lines of a video frame are not acquired at the same time as the lower lines). If an image capture device is moving during video capture, a video frame of the video may include discontinuities between pixel lines due to rolling shutter.

Warping of visual content may include manipulation of one or more portions of video frames of the video. The visual content may be warped such that a video frame (e.g., a spherical video frame) is warped based on the rotation(s) of the image capture device(s) during capture of the video frame and/or other information. The rotation(s) of the image device(s) may be used to determine how much/quickly the image capture device(s) moved during visual content capture and to determine in what direction and/or by what amount different portions (e.g., pixel lines) of the video frames should be warped.

In some implementations, the visual content may be warped further based on acquisition information for the visual content and/or other information. The acquisition information may characterize one or more exposure times of the image capture device(s) used to capture the visual content. One or more video frames of the video may be warped according to the rotation(s) of the image capture device(s) during the frame acquisition (exposure) to perform rolling shutter correction. For example, the center of a video frame may be considered as the zero reference, and other parts of the video frame may be smoothly warped considering the rotation of the image capture device(s) and the exposure time during the video frame acquisition.

In some implementations, rotation of visual content may be stored as rotated visual content and/or instruction for rendering visual content. For example, rotation of the visual content may be stored as a video with one or more rotated video frames. Rotation of the visual content may be stored as information defining how one or more video frames of a video should be rotated during presentation to provide a stabilized presentation of the video.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer program components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
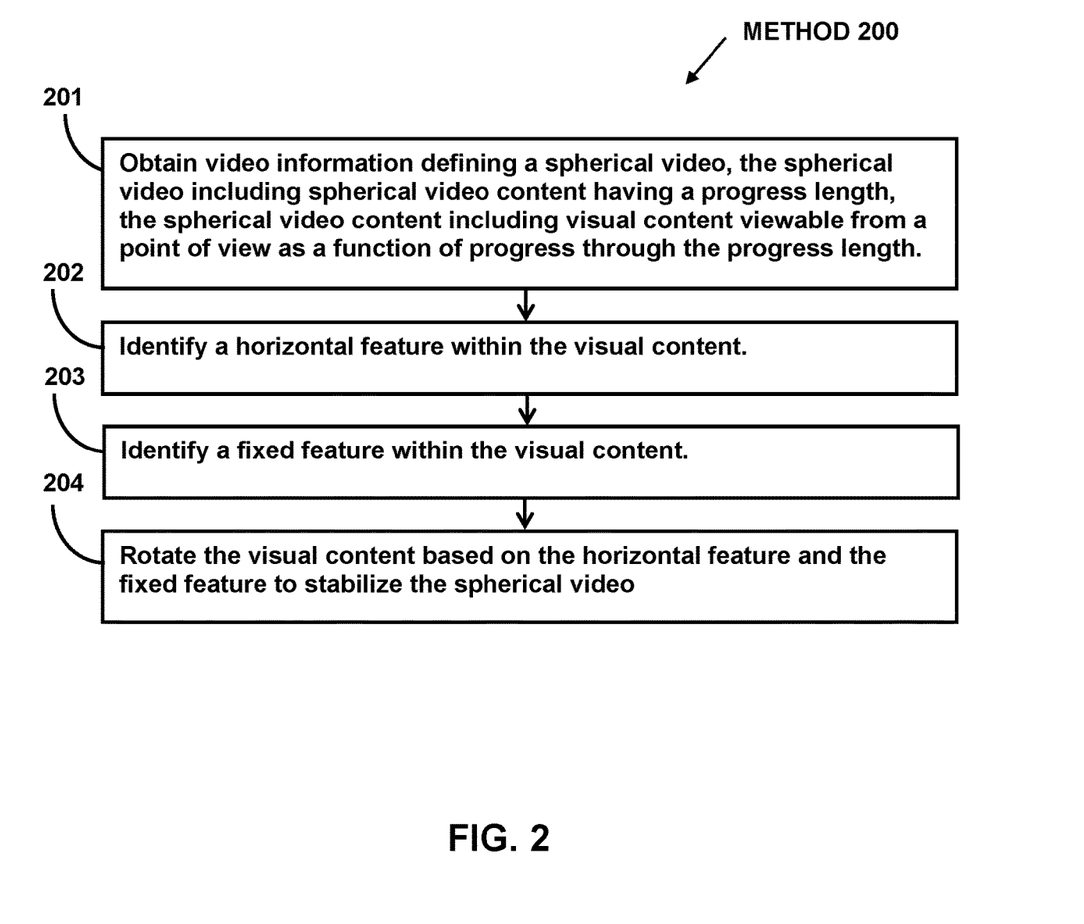
FIG. 2 illustrates a method for stabilizing videos.

FIG. 2 illustrates method 200 for stabilizing videos. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operation of method 200.

Referring to FIG. 2 and method 200, at operation 201, video information defining a spherical video may be obtained. The spherical video may include spherical video content having a progress length. The spherical video content may include visual content viewable from a point of view as a function of progress through the progress length. In some implementation, operation 201 may be performed by a processor component the same as or similar to the video information component 102 (Shown in FIG. 1 and described herein).

At operation 202, a horizontal feature within the visual content may be identified. In some implementations, operation 202 may be performed by a processor component the same as or similar to the horizontal feature component 104 (Shown in FIG. 1 and described herein).

At operation 203, a fixed feature within the visual content may be identified. The fixed feature may be different from the horizontal feature. In some implementations, operation 203 may be performed by a processor component the same as or similar to the fixed feature component 106 (Shown in FIG. 1 and described herein).

At operation 204, the visual content may be rotated based on the horizontal feature and the fixed feature to stabilize the spherical video. In some implementations, operation 204 may be performed by a processor component the same as or similar to the rotation component 108 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system that stabilizes videos, the system comprising:
one or more physical processors configured by machine-readable instructions to:
obtain video information defining a spherical video, the spherical video including spherical video content having a progress length, the spherical video content including visual content viewable from a point of view as a function of progress through the progress length, the visual content captured by an image capture device, the image capture device rotated during capture of the visual content such that the visual content of the spherical video includes depiction of jerky or shaky motion;
identify a horizontal feature within the visual content;
identify a fixed feature within the visual content, the fixed feature different from the horizontal feature, the fixed feature depicting an object that is fixed in space for stabilization of the visual content; and
stabilize the spherical video based on the horizontal feature and the fixed feature within the visual content to compensate for the rotation of the image capture device during capture of the visual content, stabilization of the visual content removing the depiction of the jerky or shaky motion from the visual content of the spherical video, the stabilization of the spherical video performed by rotating the visual content, rotation of the visual content based on the horizontal feature including orienting video frames of the spherical video according to position of the horizontal feature to provide tilt stabilization and rotation of the visual content based on the fixed feature including orienting the video frames of the spherical video according to position of the fixed feature to provide lateral stabilization, the tilt stabilization including sloping of the horizontal feature removed from the visual content and the lateral stabilization including side-to-side stabilization of the visual content.

2. The system of claim 1, wherein the fixed feature includes a depiction of a distant object within the visual content.

3. The system of claim 2, wherein the distant object includes a light source.

4. The system of claim 3, wherein the distant object is identified based on identification of a round shape and saturation of pixels within the round shape.

5. The system of claim 4, wherein the distant object includes the Sun.

6. The system of claim 5, wherein position of the fixed feature within the visual content is changed for stabilization of the spherical video as the function of progress through the progress length to account for movement of the Sun during the progress length.

7. The system of claim 1, wherein the horizontal feature includes a depiction of a horizon within the visual content.

8. The system of claim 7, wherein the horizon is identified based on variance of pixel characteristic within the visual content.

9. The system of claim 8, wherein the horizon is identified such that a first variance of pixel characteristics below the horizon and a second variance of pixel characteristics above the horizon are minimized.

10. The system of claim 1, wherein the video frames are oriented according to the position of the horizontal feature and the position of the fixed feature to minimize displacement of the horizontal feature and the fixed feature between the video frames.

11. A method for stabilizing videos, the method performing by a computing system including one or more processors, the method comprising:

obtaining, by the computing system, video information defining a spherical video, the spherical video including spherical video content having a progress length, the spherical video content including visual content viewable from a point of view as a function of progress through the progress length, the visual content captured by an image capture device, the image capture device rotated during capture of the visual content such that the visual content of the spherical video includes depiction of jerky or shaky motion;

identifying, by the computing system, a horizontal feature within the visual content;

identifying, by the computing system, a fixed feature within the visual content, the fixed feature different from the horizontal feature, the fixed feature depicting an object that is fixed in space for stabilization of the visual content; and stabilize, by the computing system, the spherical video based on the horizontal feature and the fixed feature within the visual content to compensate for the rotation of the image capture device during capture of the visual content, stabilization of the visual content removing the depiction of the jerky or shaky motion from the visual content of the spherical video, the stabilization of the spherical video performed by rotating the visual content, rotation of the visual content based on the horizontal feature including orienting video frames of the spherical video according to position of the horizontal feature to provide tilt stabilization and rotation of the visual content based on the fixed feature including orienting the video frames of the spherical video according to position of the fixed feature to provide lateral stabilization, the tilt stabilization including sloping of the horizontal feature removed from the visual content and the lateral stabilization including side-to-side stabilization of the visual content.

12. The method of claim 11, wherein the fixed feature includes a depiction of a distant object within the visual content.

13. The method of claim 12, wherein the distant object includes a light source.

14. The method of claim 13, wherein the distant object is identified based on identification of a round shape and saturation of pixels within the round shape.

15. The method of claim 14, wherein the distant object includes the Sun.

16. The method of claim 15, wherein position of the fixed feature within the visual content is changed for stabilization of the spherical video as the function of progress through the progress length to account for movement of the Sun during the progress length.

17. The method of claim 11, wherein the horizontal feature includes a depiction of a horizon within the visual content.

18. The method of claim 17, wherein the horizon is identified based on variance of pixel characteristic within the visual content.

19. The method of claim 18, wherein the horizon is identified such that a first variance of pixel characteristics below the horizon and a second variance of pixel characteristics above the horizon are minimized.

20. The method of claim 11, wherein the video frames are oriented according to the position of the horizontal feature and the position of the fixed feature to minimize displacement of the horizontal feature and the fixed feature between the video frames.

* * * * *